Dec. 29, 1925.  
E. S. MEEHAN  
1,567,972  
VEHICLE DRIVING MECHANISM  
Filed Feb. 4, 1924  
2 Sheets-Sheet 2
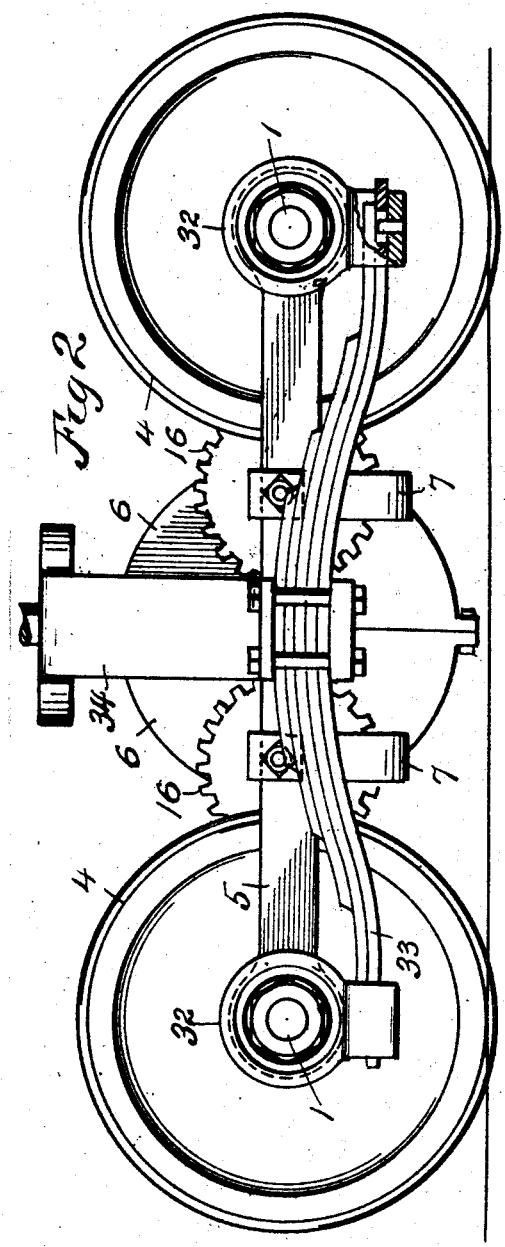
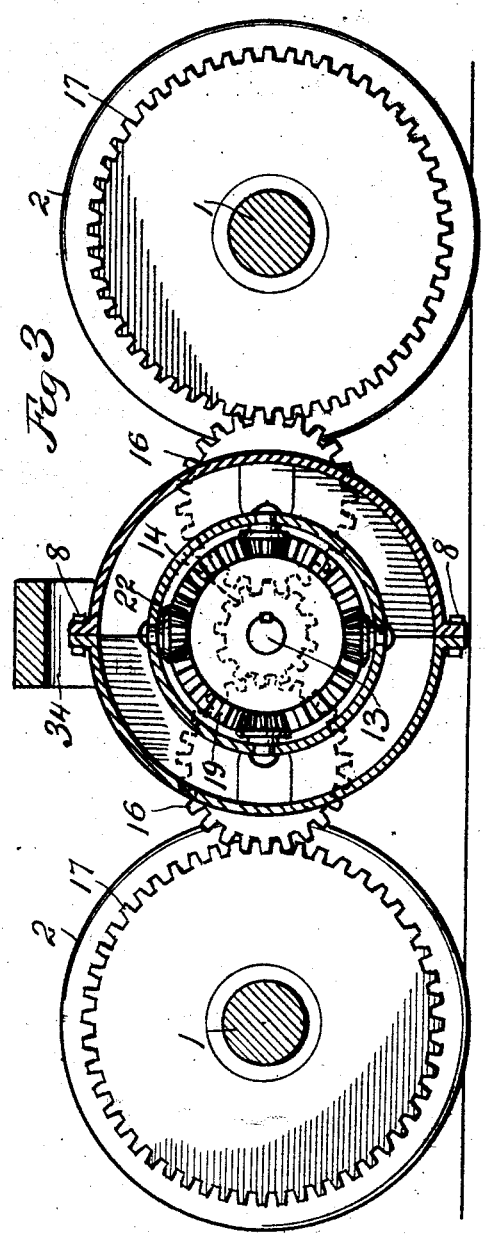
WITNESS:  
R. E. Hamilton
INVENTOR,  
Edward S. Meehan,  
BY Warren D. House  
His ATTORNEY.

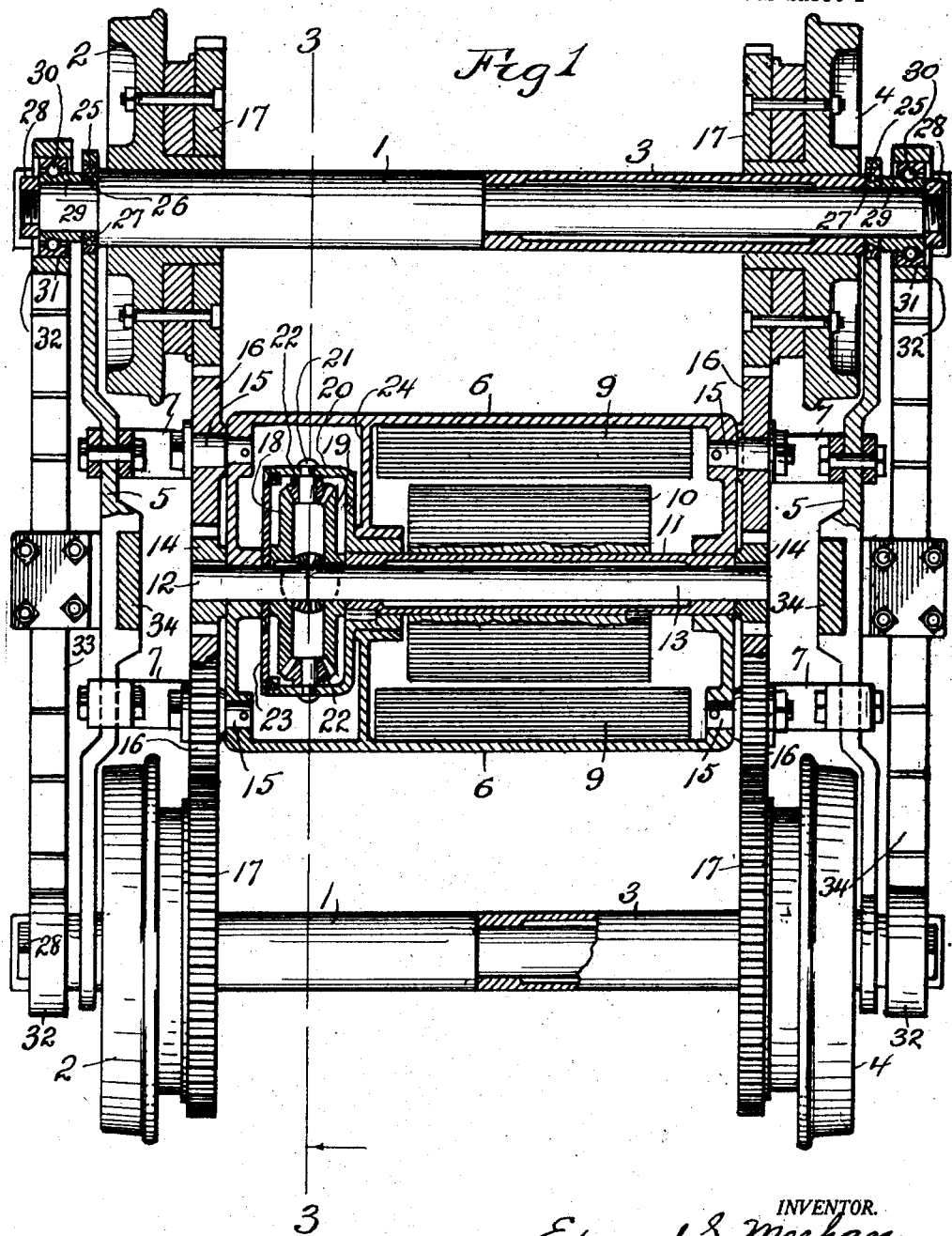

Patented Dec. 29, 1925.

1,567,972

UNITED STATES PATENT OFFICE.

EDWARD S. MEEHAN, OF KANSAS CITY, MISSOURI.

VEHICLE DRIVING MECHANISM.

Application filed February 4, 1924. Serial No. 690,461.

*To all whom it may concern:*

Be it known that I, EDWARD S. MEEHAN, a citizen of the United States, residing at Kansas City, in the county of Jackson and State of Missouri, have invented a certain new and useful Improvement in Vehicle Driving Mechanisms, of which the following is a specification.

My invention relates to improvements in vehicle driving mechanisms. It is particularly well adapted for use in connection with motor driven railway trucks.

One of the objects of my invention is to provide a novel driving mechanism of the kind described by which the wheels at one side of the truck may be differentially driven with respect to the wheels at the other side of the truck, and by which the wheels at each side are positively independently driven.

A further object of my invention is to provide a construction which is simple, strong, durable, cheap to make, not liable to get out of order, which is readily applicable to existing makes of trucks, and which affords a minimum of friction and torsional strain.

My invention further provides a novel frame for supporting the motor.

A further object of my invention is to provide a novel construction which eliminates the use of universal joints.

My invention provides further a novel housing for the motor and differential gearing.

My invention provides still further a novel construction of axle.

The novel features of my invention are hereinafter fully described and claimed.

In the accompanying drawings, which illustrate the preferred embodiment of my invention, Fig. 1 is a view partly in plan and partly in horizontal section of a truck which embodies my improved driving mechanism, Fig. 2 is a side elevation of the same.

Fig. 3 is a vertical section on the line 3—3 of Fig. 1.

Similar reference characters designate similar parts in the different views.

1 designates two axles on which are respectively secured and rotatable therewith two wheels 2 disposed one ahead of the other, and which constitute a pair of carrying wheels, which are shown as car wheels and which may be respectively forced onto the axles 1.

Respectively rotatably fitted on the axles 1 are two sleeves 3 on which are respectively fixed, preferably by being forced thereon two carrying wheels 4 which constitute another pair.

The wheels of each pair are dependently driven by suitable transmission gearing, hereinafter fully described, and the wheels of opposite pairs are differentially driven as will also be described.

A frame for supporting the operating motor may comprise two longitudinal side bars 5, supported at their opposite ends respectively by the axles 1, and a housing comprising two semicylindrical members 6 having closed ends, and provided each at opposite ends with brackets 7 respectively secured to the side bars 5. The housing members 6 are fastened together by bolts 8, Fig. 3.

9 designates an electric motor, field coils mounted in the housing 6, and 10 designates the motor armature which is provided with a tubular armature shaft 11 rotatably mounted in the housing 6 parallel with the axles 1.

12 designates a shaft rotatably mounted in the housing 6 and which is in longitudinal alinement with a shaft 13, which extends through and around which the armature shaft 11 is revoluble. The shafts 12 and 13 project from the housing 6 at opposite ends thereof and have respectively secured to them and rotatable therewith two gears 14.

Respectively secured to opposite ends of each housing member 6 are studs 15, on which are respectively rotatably mounted spur gear wheels 16.

Respectively secured to and rotatable with the carrying wheels 2 and 4 are spur gear wheels 17, which respectively mesh with the adjacent gears 16. The latter mesh respectively with the adjacent gears 14. By means of this construction, the carrying wheels 2 at one side of the truck are dependently positively driven in like directions. In like manner, the carrying wheels 4 are dependently positively driven in the same direction by the transmission gearing connecting them, comprising the adjacent gears 14, 16 and 17.

In order that the carrying wheels 2 may be driven differentially with respect to the carrying wheels 4, differential gearing is provided consisting of two compensating bevel gears 18 and 19, which are respectively secured to and are rotatable with the shafts 12 and 13. Secured to and rotatable with the armature shaft 11 in the housing 6 is a supporting member 20, which may be of cylindrical form and which has secured to it inwardly extending studs 21, on which are respectively rotatable intermediate gears 22, which mesh with the gears 18 and 19.

The outer open end of the member 20, is normally closed by a removable cover 23, the latter, with the member 20, constitutes a differential housing. The member 20 may be rotatably fitted at its inner end in a transverse partition 24, disposed between the differential gearing and the electric motor.

Respectively mounted in the side bars 5 are ring bearings 25, each having a ball race containing balls 26, Fig. 1, which run in races provided respectively in ring bearing 27, which are respectively mounted on the axles 1. The latter are screw threaded at their ends and have fitted thereon nuts 28, which respectively hold in place sleeves 29, respectively mounted on the end portions of the axles and which are respectively provided with ball races in which run balls 30, mounted in ring bearings 31, which are respectively mounted in hangers 32. Each pair of hangers 32 supports the ends of a longitudinal set of leaf springs 33. A bolster 34 is supported at its ends upon the middle portions of the springs 33, at opposite sides respectively of the truck.

In the operation of my invention, when the motor is operated and the armature shaft 11 is rotated therewith, the member 20 will be also rotated and will rotate the gears 18 and 19 through the intermediacy of the gears 22, in the well known manner of operation common to differential gearing. The shafts 12 and 13 will thus be rotated in like directions and such direction of rotation will be transmitted to carrying wheels 2 and 4 by the transmission gearing comprising the gears 14, 16 and 17. The carrying wheels at one side of the truck will thus be rotated dependently with respect to each other and differentially with respect to the carrying wheels at the other side of the truck, and the latter will be rotated dependently in a like direction with respect to each other.

I do not limit my invention to the structure shown and described, as many modifications, within the scope of the appended claims may be made without departing from the spirit of my invention.

What I claim is.

1. In a vehicle driving mechanism, two pairs of carrying wheels, the wheels of each pair being disposed one ahead of the other, two axles respectively secured to and rotatable with the wheels of one pair, two sleeves respectively rotatable on said axles and respectively secured to and rotatable with the wheels of the other pair, a frame carried by said axles, a motor carried by said frame having a driving shaft, and means including differential gearing for effecting driving relationship between the driving shaft and said carrying wheels, and by which the wheels of one pair are differentially driven relatively to the wheels of the other pair.

2. In a vehicle driving mechanism, two pairs of carrying wheels, the wheels of each pair being disposed one ahead of the other, two axles respectively secured to and rotatable with the wheels of one pair, two sleeves respectively rotatable on said axles and respectively secured to and rotatable with the wheels of the other pair, a frame carried by said axles, a motor carried by said frame having a driving shaft parallel with said axles, transmission gearing connecting the wheels of each pair, and means including differential gearing by which driving connection is established between the transmission gearing connecting the two pairs of wheels and the driving shaft.

3. In a vehicle driving mechanism, two pairs of carrying wheels, the wheels of each pair being one ahead of the other, two axles respectively secured to and rotatable with the wheels of one pair, the wheels of the other pair being respectively rotatably mounted on said axles, a frame carried by said axles, a motor carried by said frame having a driving shaft parallel with said axles, transmission gearing connecting the wheels of each pair, two shafts respectively connected to the transmission gearing of said pairs, and differential gearing connecting said driving shaft with said two shafts.

4. In a vehicle driving mechanism, two pairs of carrying wheels, the wheels of each pair being one ahead of the other, two axles, respectively secured to and rotatable with the wheels of one pair, the wheels of the other pair being respectively rotatably mounted on said axles, a frame carried by said axles having a driving shaft, transmission gearing connecting the wheels of each pair, a supporting member attached to and rotatable with said driving shaft, two rotary shafts respectively having driving connection with the transmission gearing of said two pairs, two gears respectively secured to and rotatable with said two shafts, and an intermediate gear carried by and rotatable on said supporting member and meshing with said gears.

5. In a vehicle driving mechanism, an axle, two carrying wheels, one secured to and rotatable with the axle and the other rotatable on said axle, a frame mounted on said axle and including a motor housing, a motor in said housing having a driving shaft parallel with said axle, two shafts mounted in said housing, two gears respectively secured to and rotatable with said two shafts, a supporting member attached to and rotatable with said driving shaft, an intermediate gear carried by and rotatable with said supporting member, and transmission gearing connecting said two shafts respectively with said carrying wheels.

6. In a vehicle driving mechanism, an axle, a carrying wheel secured to and rotatable with said axle, a carrying wheel rotatable on said axle, two side bars mounted on said axle, a housing carried by said bars, a tubular driving shaft parallel with said axle and rotatable in said housing, two shafts rotatable in said housing and around one of which the driving shaft is revoluble, two gears respectively secured to and rotatable with said two shafts, a supporting member attached to and rotatable with said driving shaft, an intermediate gear meshing with said two gears and carried by and rotatable with said supporting member, and transmission gearing connecting said two shafts with said carrying wheels respectively.

7. In a vehicle driving mechanism, two axles, two pairs of carrying wheels, one pair being respectively secured to and rotatable with said axles, the wheels of the other pair being rotatable on said axles respectively, two side bars carried by said axles, a housing carried by said bars, an armature rotatable in said housing having a tubular armature shaft parallel with said axles, two longitudinally alined shafts rotatable mounted in said housing one extending through said armature shaft, two gears respectively secured to and rotatable with said two shafts, a supporting member secured to and rotatable with said armature shaft, an intermediate gear secured rotatably on said member and meshing with said gears, and transmission gearing connecting said two shafts with said two pairs of carrying wheels respectively.

8. In a vehicle driving mechanism, two axles, two side bars supported at their ends respectively by said axles, and a motor housing comprising two co-operating members each having end brackets respectively supported by said side bars.

9. In a vehicle driving mechanism, two axles, two side bars supported at their front and rear ends by said axles respectively, a motor housing comprising two members each supported at opposite ends respectively by said side bars, and means for detachably fastening said members together.

In testimony whereof I have signed my name to this specification.

EDWARD S. MEEHAN.